US012711734B2

(12) United States Patent
Nakabayashi et al.

(10) Patent No.: US 12,711,734 B2
(45) Date of Patent: Aug. 18, 2026

(54) DIFFERENCE RECOGNITION METHOD AND DIFFERENCE RECOGNITION SYSTEM

(71) Applicant: OBAYASHI CORPORATION, Tokyo (JP)

(72) Inventors: Takuma Nakabayashi, Foster City, CA (US); Chih-Hung E. Yeh, Alameda, CA (US); Anirban Roy, San Francisco, CA (US)

(73) Assignee: OBAYASHI CORPORATION, Tokyo (JP)

( * ) Notice: Subject to any disclaimer, the term of this patent is extended or adjusted under 35 U.S.C. 154(b) by 268 days.

(21) Appl. No.: 18/231,712

(22) Filed: Aug. 8, 2023

(65) Prior Publication Data

US 2025/0054275 A1 Feb. 13, 2025

(51) Int. Cl.
*G06V 10/74* (2022.01)
*G06V 20/70* (2022.01)

(52) U.S. Cl.
CPC ............ *G06V 10/761* (2022.01); *G06V 20/70* (2022.01)

(58) Field of Classification Search
CPC ............................ G06V 10/761; G06V 20/70
See application file for complete search history.

(56) References Cited

U.S. PATENT DOCUMENTS

| | | | | |
|---|---|---|---|---|
| 12,576,541 | B2 * | 3/2026 | Telleria | B25J 15/0019 |
| 2014/0307974 | A1 * | 10/2014 | Tanaka | G06V 20/10 382/218 |
| 2019/0028676 | A1 | 1/2019 | Koga et al. | |
| 2020/0034592 | A1 | 1/2020 | Kawasaki et al. | |
| 2020/0410424 | A1 * | 12/2020 | Bellaish | G06Q 10/06316 |
| 2020/0413011 | A1 * | 12/2020 | Zass | G06Q 10/06316 |
| 2021/0027110 | A1 * | 1/2021 | Takahashi | G06V 10/751 |
| 2021/0240957 | A1 | 8/2021 | Kawasaki et al. | |
| 2023/0394405 | A1 * | 12/2023 | Zass | G06T 1/60 |

FOREIGN PATENT DOCUMENTS

| | | | |
|---|---|---|---|
| JP | 2001-349059 | A | 12/2001 |
| JP | 2004-005237 | A | 1/2004 |
| JP | 2007-108880 | A | 4/2007 |
| JP | 2008-225596 | A | 9/2008 |
| JP | 2010-157206 | A | 7/2010 |
| JP | 2015-212916 | A | 11/2015 |

(Continued)

*Primary Examiner* — Iriana Cruz
(74) *Attorney, Agent, or Firm* — Maschoff Brennan

(57) ABSTRACT

A difference recognition method and a difference recognition system that correctly recognizes the latest progress status. A difference recognition system recognizes the latest progress status of a construction site from a difference, which indicates progress of a construction site. The difference recognition system includes a data management unit that acquires first captured-image data captured in a first state at a first time point and second captured-image data captured in a second state at a second time point that is subsequent to the first time point, and a work determination unit serving as a difference recognition unit that recognizes a newly installed building element from the first captured-image data and second captured-image data as a difference between the first state and the second state. The task determination unit determines the latest progress status from the recognized difference.

16 Claims, 5 Drawing Sheets

(56) References Cited

FOREIGN PATENT DOCUMENTS

| | | | |
|---|---|---|---|
| JP | 2015-212917 | A | 11/2015 |
| JP | 2017-107443 | A | 6/2017 |
| JP | 2020-024658 | A | 2/2020 |
| JP | 2021-149650 | A | 9/2021 |
| JP | 2022-070512 | A | 5/2022 |
| JP | 2022-089260 | A | 6/2022 |
| JP | 2022-135733 | A | 9/2022 |
| WO | 2017/170651 | A1 | 10/2017 |

* cited by examiner

Work Determination Process

Acquire captured-image data ~S101

Repeat for each captured-image data file

Acquire 1st captured-image data ~S102

Acquire newly installed element ~S103

Search for work ~S104

Can work be identified? ~S105

YES

NO

Select work ~S106

Record work ~S107

Repeat processing until every captured-image data file is processed

END

DIFFERENCE RECOGNITION METHOD AND DIFFERENCE RECOGNITION SYSTEM

BACKGROUND

1. Field

The present disclosure relates to a difference recognition method and a difference recognition system for recognizing a difference, which indicates progress of a construction site.

2. Description of Related Art

A typical way to manage progress status at a construction site is to have a construction manager inspect the site and check whether progress is being made as scheduled or have the construction manager ask each person in charge of a construction work to report on the progress every day. Further, Japanese Laid-Open Patent Publication No. 2017-107443 discloses a progress determination system that determines the progress status of a construction from a captured image of a construction site under the present situation (present image). In Japanese Laid-Open Patent Publication No. 2017-107443, an image feature of a building element included in an image is calculated from an image of the construction site captured in the past (past image), and training data is generated from the calculated image feature. The image feature and training data of the present image are used to determine the progress status of the construction.

The progress status at a construction site will differ between locations. Further, there may be cases where the progress status changes due to a rework. The latest progress status may thus not be correctly recognized with the technique of Japanese Laid-Open Patent Publication No. 2017-107443.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A difference recognition method that achieves the above objective is for recognizing a difference, which indicates progress of a construction site. The difference recognition method includes a first state acquiring step of acquiring first captured-image data captured in a first state at a first time point, a second state acquiring step of acquiring second captured-image data captured in a second state at a second time point that is subsequent to the first time point, and a difference recognition step of recognizing a difference corresponding to a change from the first state to the second state based on the first captured-image data and the second captured-image data.

A difference recognition system that achieves the above objective is for recognizing a difference, which indicates progress of a construction site. The difference recognition system includes a data management unit that acquires first captured-image data captured in a first state at a first time point and second captured-image data captured in a second state at a second time point that is subsequent to the first time point, and a difference recognition unit that recognizes a difference between the first state and the second state based on the first captured-image data and the second captured-image data.

With the configurations described above, progress at a construction site is recognized from the first captured-image data and the second captured-image data that are arranged in chronological order. This allows the latest progress status, including rework, to be recognized correctly.

In the difference recognition method of the configuration described above, the difference recognition step may acquire a change in recognition possibility of the difference when exchanging a chronological relationship of the first captured-image data and the second captured-image data, and recognize a rework as the difference in accordance with the change in the recognition possibility.

In the difference recognition method of the configuration described above, the difference recognition step may recognize a rework as the difference when an element included in the first captured-image data is determined as having been removed in the second captured-image data.

In the difference recognition method of the configuration described above, the difference recognition step may recognize the rework by comparing a change in work from the first captured-image data to the second captured image data with a chronological order of works prepared in advance.

In the difference recognition method of the configuration described above, the difference recognition step may use a model that learns the difference so as to recognize the difference.

With the configuration described above, the model that learns the difference is used to recognize the difference. This allows the latest progress status to be recognized correctly even if, for example, the image-capturing spot differs between the first captured-image data and the second captured-image data.

In the difference recognition method of the configuration described above, the difference recognition step may extract a portion changed between the first-captured image data and the second captured-image data and then use the model to recognize the difference.

With the configuration described above, a portion changed between the first-captured image data and the second captured-image data is extracted before using the model to recognize the difference. This reduces the calculation load when using the model to recognize the difference.

The difference recognition method of the above configuration may assign a label indicating the difference during the learning of the model.

With the configuration described above, the assignment of a label indicating the difference during learning of the model allows the progress status to be recognized with each label.

The difference recognition method of the above configuration may generate captured-image data distinguishing a region indicating the difference during learning of the model.

With the configuration described above, captured-image data distinguishing a region indicating the difference is generated during learning of the model. This allows for visual recognition of the region of the difference between the first captured-image data and the second captured-image data.

Preferably, the difference recognition method of the configuration described above categorizes the difference in the difference recognition step.

With the configuration described above, the difference between the first captured-image data and the second captured-image data can be categorized.

In the difference recognition method of the configuration described above, there is a middle time point between the first time point and the second time point, and a difference between the first time point and the middle time point may be recognized based on the first captured-image data and the second captured-image data.

With the configuration described above, the difference between the first captured-image data and the second captured-image data can be recognized by recognizing the difference between the first time point and the middle time point.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

With reference to FIGS. 1 to 8, one embodiment of a difference recognition method and a difference recognition system will now be described.

Figure 1:
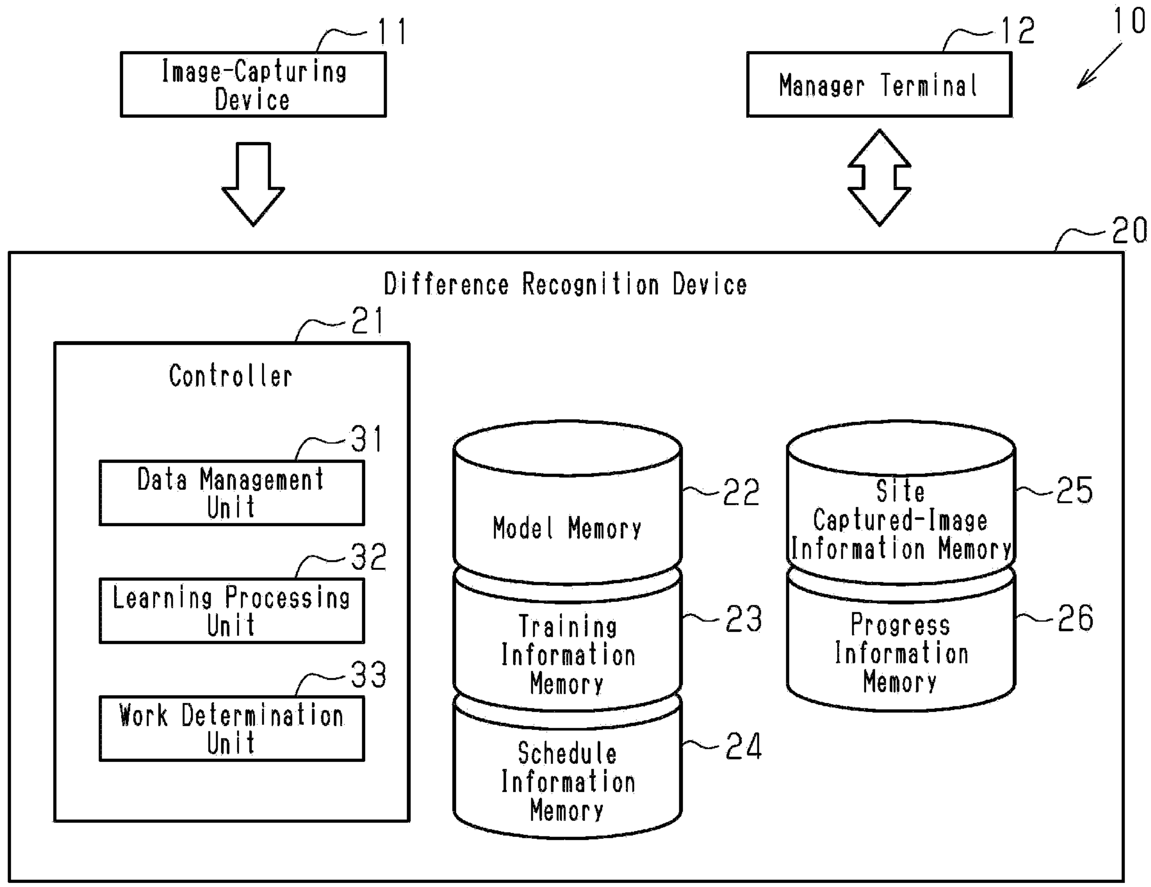
FIG. 1 is a schematic block diagram showing the configuration of one embodiment of a difference recognition system.

As shown in FIG. 1, a difference recognition system 10 is a system that supports construction progress status management by recognizing a difference, which indicates progress of a construction site, from captured-image data that is captured at the construction site. The difference recognition system 10 includes an image-capturing device 11, a manager terminal 12, and a difference recognition device 20.

Hardware Configuration

Figure 2:
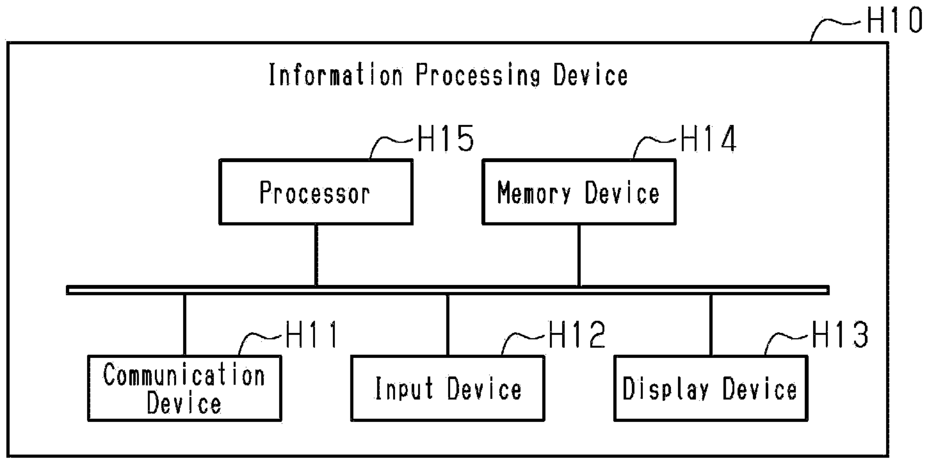
FIG. 2 is a block diagram showing one example of the hardware configuration of an information processing device.

With reference to FIG. 2, the hardware configuration of an information processing device H10 forming the image-capturing device 11, the manager terminal 12, and the difference recognition device 20 will be described. The information processing device H10 includes a communication device H11, an input device H12, a display device H13, a memory device H14, and a processor H15. The hardware configuration is one example and other hardware configurations may be implemented.

The communication device H11 is an interface, such as a network interface or a wireless interface, that establishes communication paths with other devices to send and receive data.

The input device H12 is a device that accepts inputs from a user or the like and is, for example, a mouse, a keyboard, or the like. The display device H13 is a display or the like that displays various information. A touch panel display or the like has the functionalities of the input device H12 and the display device H13.

The memory device H14 stores data and various programs to implement the functionalities of the image-capturing device 11, the manager terminal 12, and the difference recognition device 20. Examples of the memory device H14 include a ROM, a RAM, a hard disk, or the like.

The processor H15 uses the programs and data stored in the memory device H14 to control processes. Examples of the processor H15 include a CPU, an MPU, or the like. The processor H15 deploys programs stored in a ROM or the like with the RAM to execute various processes providing service.

The processor H15 does not have to execute all processes through software-processing. For example, the processor H15 may include a special-purpose hardware circuit, such as an application specific integrated circuit (ASIC) that executes at least some processes through hardware-processing. More specifically, the processor H15 may be any of the following.

(1) One or more processors running on computer programs (software).

(2) One or more special-purpose hardware circuits that execute at least some of the processes.

(3) Circuitry including a combination of the above elements.

A processor includes a CPU and a memory, such as a RAM and a ROM, and the memory stores program codes or instructions configured to have the CPU execute a process. The memory, namely, a computer-readable medium, includes any available medium that is accessible by a versatile or special-purpose computer.

System Configuration

As shown in FIG. 1, the image-capturing device 11 is an image-capturing means for capturing an image at a construction site where construction is being performed. In one example, the image-capturing device 11 is a camera that acquires image data as captured-image data of a construction site. In another example, the image-capturing device 11 is a three-dimensional laser scanner that acquires point cloud data as captured-image data of a construction site. The image-capturing device 11 does not have to be carried by a person and may be mounted on a robot that goes around a construction site for inspection under autonomous control or may be a non-manned airplane operated by a person.

The image-capturing device 11 stores an identifier annotated to the captured-image data indicating the date and time when the image was captured and the location where the image was captured. The date and time of a captured image can be acquired from a timer incorporated in the image-capturing device 11. The location of a captured image can be acquired by manually inputting the location through an input means of the image-capturing device 11 or by using a position specifying means such as a Global Positioning System (GPS). The captured-image data is uploaded to the difference recognition device 20. The captured-image data can be uploaded from the image-capturing device 11 directly to the difference recognition device 20 or via the manager terminal 12.

The manager terminal 12 is a computer terminal used by a manager who manages the progress status of work at a construction site.

The difference recognition device 20 is a computer that uses the captured-image data of a construction site to support construction progress status management. The difference recognition device 20 includes a controller 21, a model memory 22, a training information memory 23, a schedule information memory 24, a site captured-image information memory 25, and a progress information memory 26.

The controller 21 executes programs for various processes, which will be described later, to implement the functionalities of a data management unit 31, a learning processing unit 32, a work determination unit 33, and the like.

The data management unit 31 executes a process for acquiring training data from the manager terminal 12. During the process, the data management unit 31 stores the acquired training data in the training information memory 23.

The data management unit 31 executes a process for acquiring schedule management data from the manager terminal 12. During the process, the data management unit 31 stores the acquired schedule management data in the schedule information memory 24.

The data management unit 31 executes a process for acquiring the captured-image data captured by the image-capturing device 11. During the process, the data management unit 31 stores the acquired captured-image data in the site captured-image information memory 25.

The learning processing unit 32 executes a learning process using the training data stored in the training information memory 23 and a machine learning model stored in the model memory 22.

The learning data includes learning captured-image data captured a state of each work at a time point at a construction site. The captured-image data is arranged in chronological order. The time point can be the completion of each work or any point from the beginning to the completion of the work. Further, the training data includes labels, indicating building elements installed during each work, as ground truth data.

More specifically, the training data includes patterns of combinations of first learning captured-image data indicating a first state of a construction site at time t (first time point), second learning captured-image data indicating a second state of the construction site at time t+1 (second time point), and labels indicating building elements newly installed between time t and time t+1 (hereafter referred to as newly installed elements). A label is ground truth data corresponding to the first learning captured-image data and the second learning captured-image data.

Figure 3:
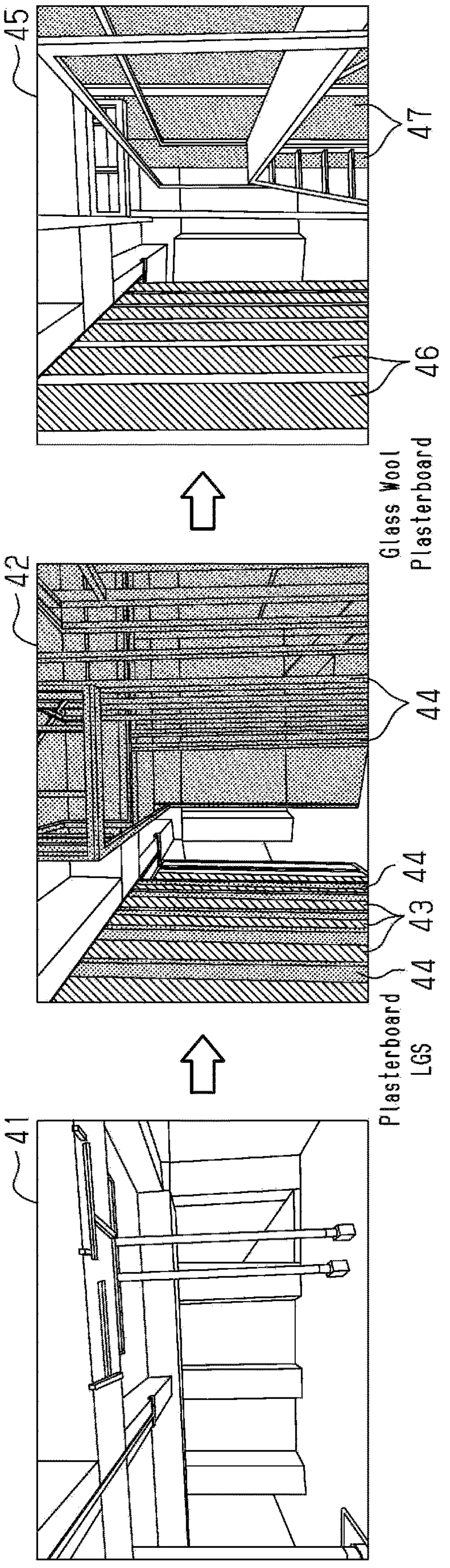
FIG. 3 is a diagram showing one example of captured-image data arranged in chronological order and labels assigned between the captured-image data.

With reference to FIG. 3, examples of patterns included in the training data will be described. In FIG. 3, the captured-image data of a construction site is arranged in chronological order from left to right.

As shown in FIG. 3, plasterboards 43 and Light Gauge Steel (LGS) 44 are identified as newly installed elements between learning captured-image data 41 and learning captured-image data 42. In this case, the learning captured-image data 41 serves as the first learning captured-image data, and the learning captured-image data 42 serves as the second learning captured-image data. Further, labels of plasterboard and LGS are assigned. The work corresponding to this process is referred to as the plasterboard/LGS installing work. In the learning captured-image data 42, the regions marked with diagonal lines show where the plasterboards 43 are installed, and the regions marked with dots show where the LGS 44 is installed.

Further, glass wool 46 and plasterboards 47 are identified as newly installed elements between the learning captured-image data 42 and learning captured-image data 45. In this case, the learning captured-image data 42 serves as the first learning captured-image data, and the learning captured-image data 45 serves as the second learning captured-image data. Further, labels of glass wool and plasterboards are assigned. The work corresponding to this process is referred to as the glass wool/plasterboard installing work. In the learning captured-image data 45, the regions marked with diagonal lines show where the glass wool 46 is installed, and the regions marked with dots show where the plasterboards 47 are installed.

Further, for example, when a reinforcing steel region is identified in the first learning captured-image data and concrete is identified on the reinforcing steel region in the second learning captured-image data, a label of concrete is assigned. The work corresponding to this process is referred to as the concrete placing work.

Figure 4:
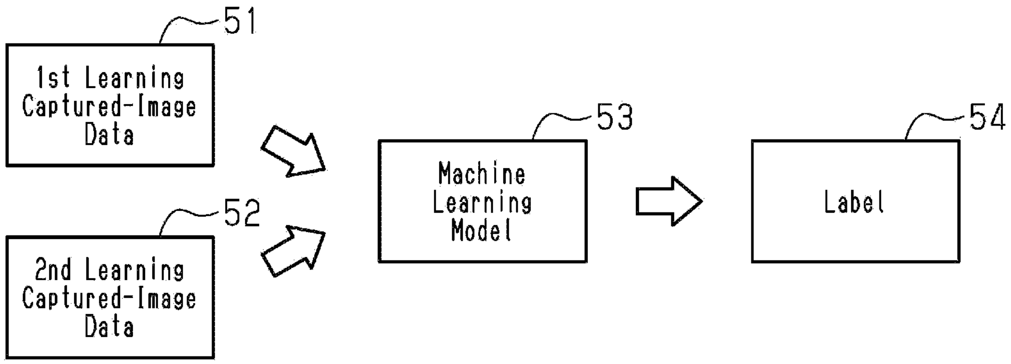
FIG. 4 is a schematic diagram illustrating a learning process.

As shown in FIG. 4, during the learning process, the learning processing unit 32 performs learning using first learning captured-image data 51 and second learning captured-image data 52 as input data and a label 54 as output data for a machine learning model 53 that is stored in the model memory 22. The learning processing unit 32 uses each pattern included in the training data to perform learning. More specifically, the learning processing unit 32 performs learning based on the first learning captured-image data and the second learning captured-image data to identify a newly installed element that is a difference therebetween. The learning processing unit 32 may use a known learning method.

The work determination unit 33 executes a process for determining progress status of a construction site from the schedule management data stored in the schedule information memory 24, the captured-image data stored in the site captured-image information memory 25, and the machine learning model 53 stored in the model memory 22. This process will be described in detail later.

Figure 5:
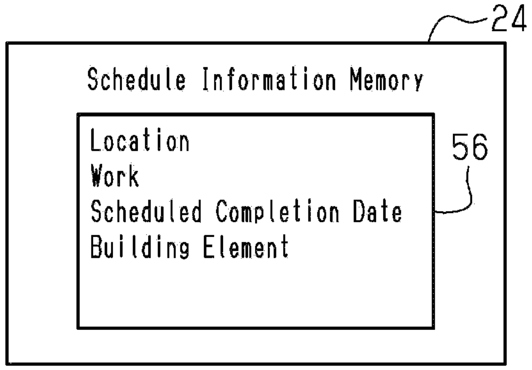
FIG. 5 is a schematic diagram illustrating the data configuration of a schedule information memory.

As shown in FIG. 5, the schedule information memory 24 records schedule management data 56 related to a construction site schedule. Determined completion dates for installing new building elements in each construction site work is recorded to the schedule management data 56 with the manager terminal 12. The schedule management data 56 includes data annotating location, work, scheduled completion data, and building element to each construction site. More specifically, the schedule management data 56 includes information indicating a construction site and data indicating location, work, scheduled completion date, and building element that are annotated to the construction site.

Data related to an identifier that specifies a location at a construction site is recorded to a location data region. The location data is used to specify, for example, a room or a construction zone. Data related to an identifier that specifies each work at a construction site is recorded to a work data region. Data related to a scheduled completion date of each work at a construction site is recorded to the scheduled completion date data region. The order of work at the construction site can be determined based on the scheduled completion date. Data related to a newly installed element of each work is recorded to the building element data region.

Figure 6:
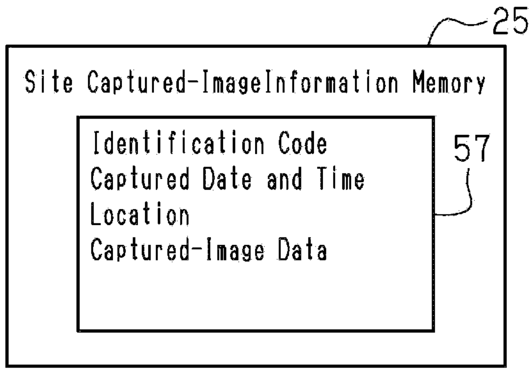
FIG. 6 is a schematic diagram illustrating the data configuration of a site information memory.

As shown in FIG. 6, image management data 57 including captured-image data of a construction site is stored in the site captured-image information memory 25. The image management data 57 is stored when captured-image data is acquired.

The image management data 57 includes an identification code, the date, time, and location of a captured image, and data related to the image. Data related to an identifier that specifies captured-image data is stored in the identification code data region. Data related to the date and time of an image captured by the image-capturing device 11 is stored in the captured image date/time data region. Data related to an identifier that specifies a location at a construction site captured by the image-capturing device 11 is stored in a location data region. The captured-image data of the construction site is stored in a captured-image data region.

Figure 7:
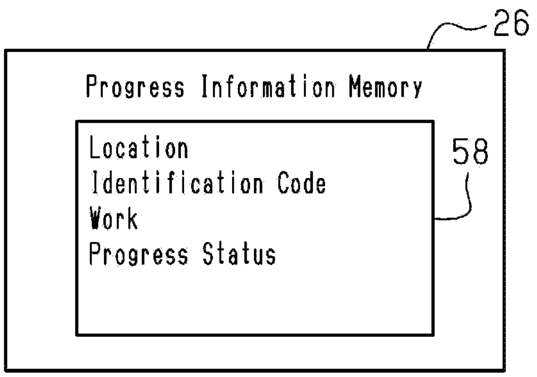
FIG. 7 is a schematic diagram illustrating the data configuration of a progress information memory.

As shown in FIG. 7, progress management data 58 for managing the progress status of a construction site is stored in the progress information memory 26. The progress management data 58 is recorded when a work determination process is performed.

The progress management data 58 includes data related to location, identification code, work, and, progress status. Data related to an identifier that specifies each location at a construction site is recorded to a location data region. Data related to an identifier that specifies the captured-image data of the location is stored in an identification code data region. Data related to an identifier that specifies work recognized based on the first captured-image data and the second captured-image data is recorded to a work data region. Data indicating the progress status with respect to a construction site schedule is recorded to a progress status data region.

Work Determination Process

Figure 8:
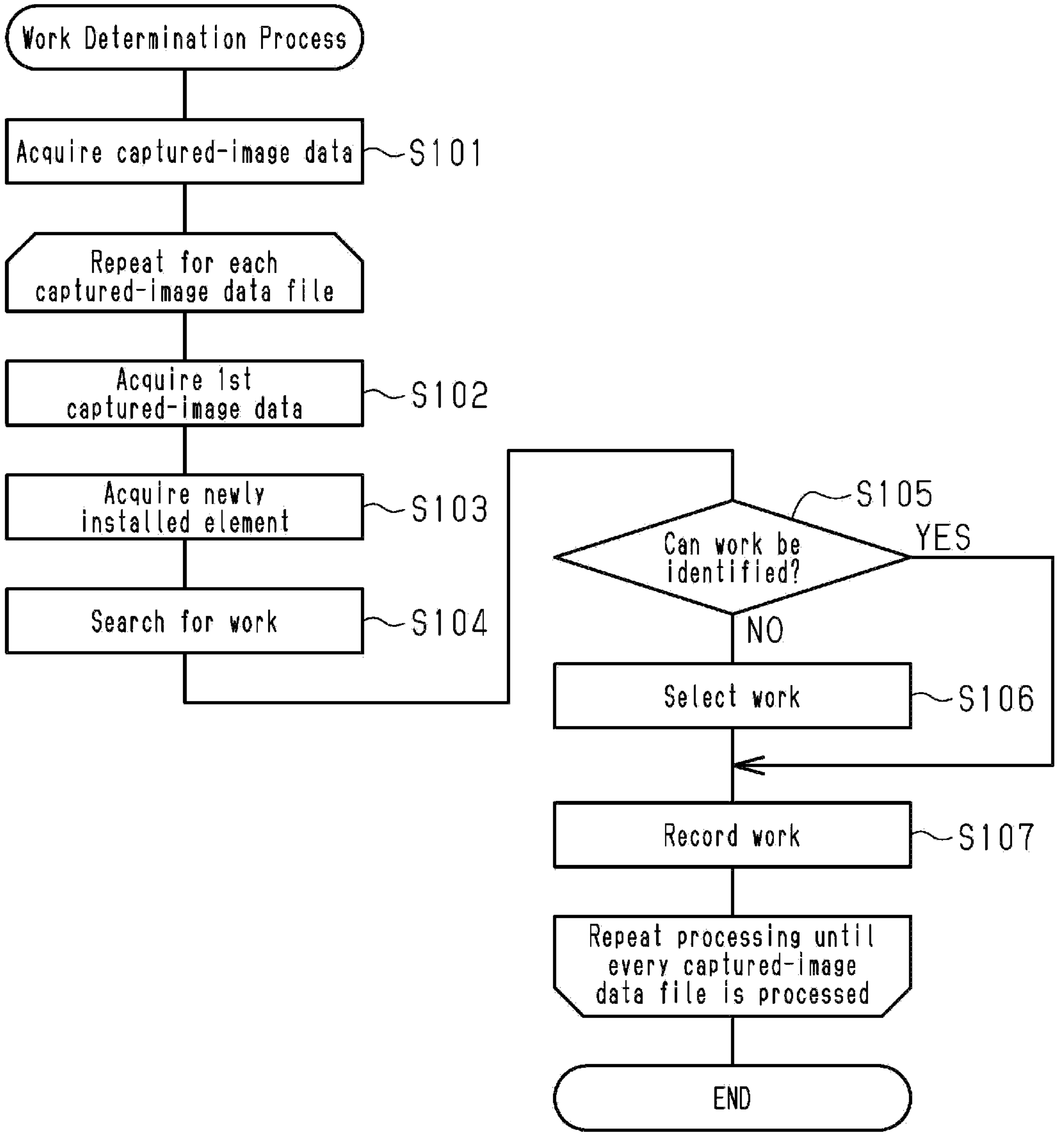
FIG. 8 is a flowchart showing one example of a work determination process.

With reference to FIG. 8, the work determination process executed by the controller 21 of the difference recognition device 20 will now be described.

The controller 21 of the difference recognition device 20 first executes a process for acquiring captured-image data of a construction site (step S101: second state acquiring step). During the process, the data management unit 31 assigns an identification code to the captured-image data uploaded to the difference recognition device 20 and stores the captured-image data in the site captured-image information memory 25. An identifier related to the captured date and location is annotated to the captured-image data.

The controller 21 of the difference recognition device 20 then uses image-captured data that is newly stored in the site captured-image information memory 25 as determination image-captured data and repetitively performs the process described below on each file of the image-captured data.

The work determination unit 33 first executes a process for acquiring first captured-image data (step S102: first state acquiring step). During the process, based on the date, time, and location annotated to the determination captured-image data, the work determination unit 33 acquires the file of the immediately preceding captured-image data captured at the same location as the first-captured image data, based on the annotated date and time, from the site captured-image information memory 25.

The work determination unit 33 then serves as a difference recognition unit and executes a process for inputting the first-captured image data and the determination captured-image data, which is the second-captured image data, to the machine learning model 53 and acquiring a label output, in response to the input, as a newly installed element from the machine learning model 53 (step S103). The processes hereafter, including step S103, form a difference recognition step.

The work determination unit 33 then executes a process for searching for the work that was performed when the determination captured-image data was captured (step S104). During the process, the work determination unit 33 searches for the work that was performed when the determination captured-image data was captured based on the location annotated to the determination captured-image data, the newly installed element output from the machine learning model 53, and the schedule management data 56 stored in the schedule information memory 24. More specifically, the work determination unit 33 acquires the schedule management data 56 corresponding to the location annotated to the determination captured-image data from the schedule information memory 24. Further, the work determination unit 33 searches the schedule management data 56 for the work including the building element that corresponds to the newly installed element.

As a result of the search, the work determination unit 33 then determines whether the work performed at the time the determination captured-image data was captured can be identified (step S105).

When the work cannot be identified (step S105: NO), the work determination unit 33 executes a process for selecting a work (step S106). More specifically, the work determination unit 33 specifies work that includes at least one of the newly installed elements in the determination captured-image data as a work candidate and outputs the specified work candidate to the manager terminal 12. Then, the work determination unit 33 acquires the work candidate designated by the manager terminal 12 as the work corresponding to the determination captured-image data.

When work can be identified (step S105: YES), the work determination unit 33 acquires the identified work as the work corresponding to the determination captured-image data and skips the process of step S106.

The work determination unit 33 then executes a process for recording the work (step S107). More specifically, the work determination unit 33 of the controller 21 records the progress management data 58 corresponding to the determination captured-image data to the progress information memory 26.

During the process, the work determination unit 33 records the location where the determination captured-image data was captured, the identification code, and the acquired work to the progress information memory 26.

Further, if the work determination unit 33 determines that the acquired work is completed, with regard to the acquired work, the work determination unit 33 compares the scheduled date of completion, recorded in the schedule management data 56 acquired when performing the search, with the captured date and time recorded in the site captured-image information memory 25 to calculate the difference in the number of days. The work determination unit 33 then records the progress status to the progress management data 58. More specifically, when the date of the captured-image data is later than the scheduled completion date, the work determination unit 33 records the delayed number of days to the progress status data region. When the date of the captured-image data is earlier than the scheduled completion date, the work determination unit 33 records the ahead number of days to the progress status data region. When the date of the captured-image data is the same as the scheduled completion date, the work determination unit 33 records "on schedule" to the progress status data region. For example, the work determination unit 33 can determine the completion of work based on the determination captured-image data, the newly installed element output from the machine learning model 53, and position data indicating the position of the newly installed element at the construction site. The position data is included in the schedule management data 56, and recorded in association with information indicating the construction site.

The work determination unit 33 repeats the above processes and completes processing when every file of captured-image data stored in the site captured-image information memory 25 has undergone the processes. Further, the work determination unit 33 records the progress status for every file of captured-image data.

Operation

In the difference recognition system 10, when checking the progress status of a location, one inputs the location to the manager terminal 12. As a result, the controller 21 of the difference recognition device 20 outputs the progress status of the location, which is based on the progress management data 58 recorded to the progress information memory 26, to the manager terminal 12.

The difference recognition method and difference recognition system in accordance with the present embodiment has the advantages described below.

(1) The difference recognition system 10 recognizes, based on the first-captured image data and the second-captured image data, a newly installed element indicating a difference between the first-captured image data and the second-captured image data. Then, work is determined from the newly installed element. Thus, when the construction is progressing as planned, a building element that is newly installed during each work will be recognized as a newly installed element. Further, even when a rework is performed, a building element that is not in the captured-image data before the rework but is in the captured-image data after the rework will be recognized as a newly installed element. As a result, the progress status of a construction site can be correctly recognized.

(2) The difference recognition system 10 recognizes a newly installed element with a machine learning model learned from training data. This ensures that a newly installed element is correctly recognized even if, for example, the spot where the first captured-image data is captured differs from the spot where the second captured-image data is captured.

(3) The learning of the machine learning model is performed based on training data that includes a label indicating a newly installed building element. This allows the difference recognition system 10 to finely determine the progress status for each newly installed building element.

(4) The learning of the machine learning model is performed based on training data including labels for a set of learning captured-image data files. This allows the work determination unit 33 to recognize the difference as categorized, newly installed elements.

The above embodiment may be modified as described below.

Figure 9:
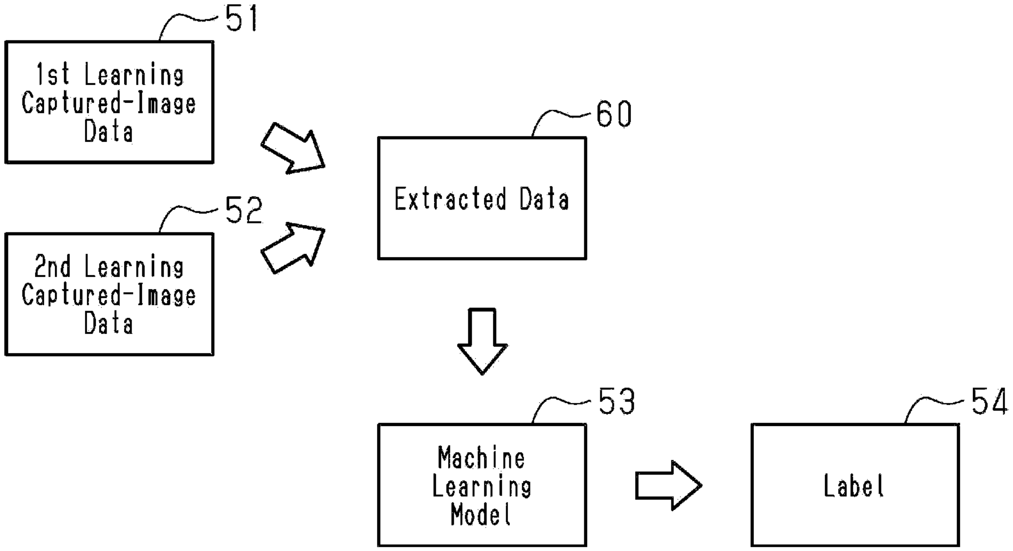
FIG. 9 is a schematic diagram illustrating the learning process in a modified example.

As shown in FIG. 9, in the learning process, the learning processing unit 32 may input extracted data 60, which is generated by extracting the portion changed between the first learning-captured image data 51 and the second learning captured-image data 52, to the machine learning model 53. In such a case, the work determination unit 33 inputs the data extracting the portion changed between the first-captured image data and the second captured-image data to the machine learning model 53.

Further, the learning processing unit 32 may perform feature matching with the first learning captured-image data 51 and the second learning captured-image data 52 to calibrate positions in the first learning captured-image data 51 and the second learning captured-image data 52 before generating the extracted data 60.

Figure 10:
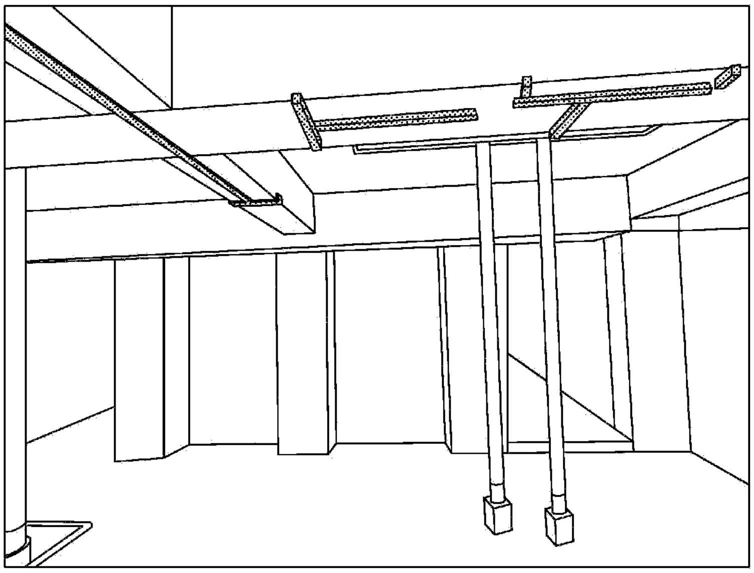
FIG. 10 is a schematic diagram illustrating the ground truth data of training data in a modified example.

As shown in FIGS. 3 and 10, the training data may use data distinguishing newly installed elements between time t and time t+1 in the second learning captured-image data as ground truth data corresponding to the first learning captured-image data and the second learning captured-image data. In FIG. 10, the regions marked with dots show newly installed elements (LGS portion in ceiling).

Image data and point cloud data may both be used as the captured-image data.

In the learning process, the learning processing unit 32 may perform learning by using the captured-image data of time t as the first learning captured-image data and the second learning captured-image data of time t+k (where k is an integer greater than or equal to 2). In other words, the learning processing unit 32 may skip learning of newly installed elements between time t and time t+k.

Further, the learning processing unit 32 may perform learning by using, for example, the captured-image data of time t+1 as the first learning captured-image data and the captured-image data of time t as the second learning captured-image data. For example, with the learning captured-image data 42 and 45 shown in FIG. 3, the learning processing unit 32 performs learning using labels indicating removal of glass wool and plasterboards as ground truth data. In this manner, the learning processing unit 32 may perform learning that takes rework into consideration. This allows the latest progress status to be further accurately recognized by taking rework into consideration.

The work determination unit 33 may recognize a difference at a middle time point, which is between the first time point and the second time point, from the first time point based on the first-captured image data and the second captured-image data.

For example, the captured-image data 41, 42, and 45 shown in FIG. 3 may respectively be the first time point, the middle time point, and the second time point. In this case, the work determination unit 33 uses the captured-image 41 as the first-captured image data and the captured image data 45 as the second captured-image data to recognize the difference between the captured-image data 41 and the captured-image data 42. More specifically, the work determination unit 33 recognizes plasterboards 43 and LGS 44 as newly installed elements at the middle time point based on the recognition of glass wool 46 and plasterboards 47 as newly installed elements between the captured-image data 41 and the captured-image data 45. In other words, when finding skipped work from the latest progress status and the progress management data 58, the work determination unit 33 records the skipped work as having been completed to the progress management data 58. Thus, even when the skipped work has to be reworked, recognition of the rework will be ensured.

In the process of acquiring a newly installed element (S103), even when the first captured-image data and the determination captured-image data (second captured-image data are input to the machine learning model 53, the newly installed element may not be acquired because of a low recognition possibility. In such a case, the work determination unit 33, in step S103, may further exchange the chronological order of the first captured-image data and the determination captured-image data input to the machine learning model 53. When the newly installed element, of which the chronological order has been exchanged, has a high recognition possibility, the work determination unit 33 can identify a rework in following step S104 (searching for the work). In this manner, a rework can be identified in an ensured manner based on the newly installed element being acquired (the recognition probability being increased) by exchanging the chronological order of the captured-image data. As a result, progress at a construction site can be correctly recognized.

Further, for example, when a newly installed element cannot be acquired in step S103, the work determination unit 33 may determine that the newly installed element has been removed in the first captured-image data and identify a rework in following step S104.

The learning processing unit 32 may learn standard construction works based on learning data. Standard construction works are, for example, typical works at a construction site listed in chronological order. The standard construction works indicate the typical chronological relationship of works.

In this case, in addition to the learning captured-image data, the learning data includes data of the work completed when capturing the learning captured-image data. The learning processing unit 32 learns a label indicating a change between the first learning captured-image data and the second learning captured-image data as ground tooth data.

For example, when the first learning captured-image data is the learning captured-image data 42 and the second learning captured-image data is the learning captured-image data 45, the learning processing unit 32 performs learning using labels indicating a change from the plasterboard/LGS installing work to the glass wool/plasterboard installing work as ground truth data.

In the work determination process of such a configuration, instead of acquiring a newly installed element in step S103, the work determination unit 33 performs a process for acquiring a change in work. Then, in step S104, the work determination unit 33 searches for, in the schedule management data stored in the schedule information memory 24, a change in work that is the same as the change in work acquired in step S103. Then, in step S105, when the schedule management data includes the same change in work, the work determination unit 33 identifies the change in work as a difference. When the schedule management data does not include the same change in work, the work determination unit 33 identifies a rework as a difference.

DESCRIPTION OF REFERENCE CHARACTERS

H10) information processing device; H11) communication device; H12) input device; H13) display device; H14) memory device; H15) processor; 10) difference recognition system; 11) image-capturing device; 12) manager terminal; 20) difference recognition device; 21) controller; 22) model memory; 23) training information memory; 24) schedule information memory; 25) site captured-image information memory; 26) progress information memory; 31) data management unit; 32) learning processing unit; 33) work determination unit functioning as difference recognition unit; 41, 42) learning captured-image data; 43) plasterboard; 44) LGS; 45) learning captured-image data; 46) glass wool; 47) plasterboard; 51) first learning captured-image data; 52) second learning captured-image data; 53) machine learning model; 54) label; 56) schedule management data; 57) image management data; 58) progress management data; 60) extracted data

What is claimed is:

1. A difference recognition method for recognizing a difference, which indicates progress of a construction site, the difference recognition method comprising:

- a first state acquiring step of acquiring first captured-image data captured in a first state at a first time point;
- a second state acquiring step of acquiring second captured-image data captured in a second state at a second time point subsequent to the first time point;
- a first difference recognition step of recognizing a first difference corresponding to a change from the first state to the second state based on the first captured-image data and the second captured-image data using a trained machine-learning model that outputs labels indicating newly installed building elements or removed building elements;
- a middle state acquiring step of acquiring middle captured-image data captured in a middle state at a middle time point between the first time point and the second time point;
- a second difference recognition step of recognizing a second difference corresponding to a change from the first state to the middle state based on the first captured-image data and the middle captured-image data; and
- a work determination step of determining a first work corresponding to a process from the first time point to the middle time point based on the first difference and the second difference.

2. The difference recognition method according to claim 1, wherein the difference recognition step includes acquiring a change in recognition possibility of the difference when exchanging a chronological relationship of the first captured-image data and the second captured-image data, and recognizing a rework as the difference in accordance with the change in the recognition possibility.

3. The difference recognition method according to claim 1, wherein the difference recognition step includes recognizing a rework as the difference when an element included in the first captured-image data is determined as having been removed in the second captured-image data.

4. The difference recognition method according to claim 1, wherein the difference recognition step includes recognizing the rework by comparing a change in work from the first captured-image data to the second captured image data with a chronological order of works prepared in advance.

5. The difference recognition method according to claim 1, wherein the difference recognition step includes using a model that learns the difference so as to recognize the difference.

6. The difference recognition method according to claim 5, wherein the difference recognition step includes extracting a portion changed between the first-captured image data and the second captured-image data and then using the model to recognize the difference.

7. The difference recognition method according to claim 5, wherein the learning of the model includes assigning a label indicating the difference.

8. The difference recognition method according to claim 5, wherein the learning of the model includes generating captured-image data distinguishing a region indicating the difference.

9. The difference recognition method according to claim 1, wherein the difference recognition step includes categorizing the difference.

10. The difference recognition method according to claim 1, wherein the work determination step comprises:

specifying a second work corresponding to the second difference; and determining the first work based on the second work and the first difference.

11. A difference recognition system for recognizing a difference, which indicates progress of a construction site, the difference recognition system comprising:

a data management unit that acquires first captured-image data captured in a first state at a first time point, second captured-image data captured in a second state at a second time point that is subsequent to the first time point, and middle captured-image data captured in a middle state at a middle time point between the first time point and the second time point;

a difference recognition unit that recognizes a first difference and a second difference, the first difference corresponding to a change from the first state to the second state based on the first captured-image data and the second captured-image data using a trained machine-learning model that outputs labels indicating newly installed building elements or removed building elements, and the second difference corresponding to a change from the first state to the middle state based on the first captured-image data and the middle captured-image data; and a work determination unit that determines a first work corresponding to a process from the first time point to the middle time point based on the first difference and the second difference.

12. The difference recognition system according to claim 11, wherein the work determination unit is further configured to:

specify a second work corresponding to the second difference; and determine the first work based on the second work and the first difference.

13. A difference recognition method for recognizing a difference, which indicates progress of a construction site, the difference recognition method comprising:

a first state acquiring step of acquiring first captured-image data captured in a first state at a first time point;

a second state acquiring step of acquiring second captured-image data captured in a second state at a second time point subsequent to the first time point;

a first difference recognition step of recognizing a first difference corresponding to a change from the first state to the second state based on the first captured-image data and the second captured-image data using a trained machine-learning model that outputs labels indicating newly installed building elements or removed building elements;

a third state acquiring step of acquiring third captured-image data captured in a third state at a third time point subsequent to the first time point and the second time point;

a second difference recognition step of recognizing a second difference corresponding to a change from the second state to the third state based on the second captured-image data and the third captured-image data; and a work determination step of determining a first work corresponding to a process from the first time point to the second time point based on the first difference and the second difference.

14. The difference recognition method according to claim 13, wherein the work determination step comprises:

specifying a second work corresponding to the first difference; and determining the first work based on the second work and the second difference.

15. A difference recognition system for recognizing a difference, which indicates progress of a construction site, the difference recognition system comprising:

a data management unit that acquires first captured-image data captured in a first state at a first time point, second captured-image data captured in a second state at a second time point that is subsequent to the first time point, and third captured-image data captured in a third state at a third time point subsequent to the first time point and the second time point;

a difference recognition unit that recognizes a first difference and a second difference, the first difference corresponding to a change from the first state to the second state based on the first captured-image data and the second captured-image data using a trained machine-learning model that outputs labels indicating newly installed building elements or removed building elements, and the second difference corresponding to a change from the second state to the third state based on the second captured-image data and the third captured-image data; and a work determination unit that determines a first work corresponding to a process from the first time point to the second time point based on the first difference and the second difference.

16. The difference recognition system according to claim 15, wherein the work determination unit is further configured to:

specify a second work corresponding to the first difference; and determine the first work based on the second work and the second difference.

* * * * *